(12) United States Patent
Huang et al.

(10) Patent No.: US 11,042,524 B1
(45) Date of Patent: Jun. 22, 2021

(54) SELF-ADAPTIVE EXECUTION METHOD OF SMART CONTRACT FOR REALIZING DATA TRUSTWORTHINESS

(71) Applicant: PEKING UNIVERSITY, Beijing (CN)

(72) Inventors: Gang Huang, Beijing (CN); Ying Zhang, Beijing (CN); Huaqian Cai, Beijing (CN); Xuanzhe Liu, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 17/148,144

(22) Filed: Jan. 13, 2021

(30) Foreign Application Priority Data

Aug. 12, 2020 (CN) .......................... 202010808943.2

(51) Int. Cl.
*H04L 12/28* (2006.01)
*G06F 16/21* (2019.01)
*H04L 9/08* (2006.01)
*H04L 29/08* (2006.01)
*H04L 9/32* (2006.01)

(52) U.S. Cl.
CPC .......... *G06F 16/219* (2019.01); *H04L 9/0825* (2013.01); *H04L 9/3242* (2013.01); *H04L 9/3247* (2013.01); *H04L 67/1051* (2013.01)

(58) Field of Classification Search
USPC ........................................................ 370/329
See application file for complete search history.

(56) References Cited

U.S. PATENT DOCUMENTS 7,280,975 B1 * 10/2007 Donner .................. G06Q 10/02
235/382

* cited by examiner

*Primary Examiner* — Dang T Ton
(74) *Attorney, Agent, or Firm* — Bayramoglu Law Offices LLC

(57) ABSTRACT

A self-adaptive execution method for realizing data trustworthiness includes: starting a smart contract, executing the smart contract and verifying an execution result of the smart contract. A random execution mode based on redundant calculation is employed, and multiple nodes in a network are randomly selected to jointly execute a data analysis logic, thereby realizing trusted computing of an execution result in a relatively distrusted environment and improving an execution efficiency of the smart contract. Meanwhile, by recording the execution of the contract in a process of synchronously calling the multiple nodes, a needed execution record of contract calling is acquired from the node in a latest state and replayed locally when synchronization is needed, so that the random multiple nodes can be quickly recovered when states of the random multiple nodes are not synchronized, realizing high availability of data and satisfying a data analysis scenario with low response time.

10 Claims, 12 Drawing Sheets

SELF-ADAPTIVE EXECUTION METHOD OF SMART CONTRACT FOR REALIZING DATA TRUSTWORTHINESS

CROSS REFERENCE TO THE RELATED APPLICATIONS

This application is based upon and claims priority to Chinese Patent Application No. 202010808943.2, filed on Aug. 12, 2020, the entire contents of which are incorporated herein by reference.

TECHNICAL FIELD

The disclosure relates to field of blockchain technologies, and more particularly, to a self-adaptive execution method for realizing data trustworthiness.

BACKGROUND

As a core force to drive the development of digital economy, and also a key factor to improve a smart level and operational efficiency of information society, data resources are regarded as strategic assets to determine future competitiveness. How to turn the huge data resources formed by the government, enterprises and institutions into assets and make the data resources become "new oil" to support the rise of the digital economy is a key challenge for the development of the digital economy.

Values of big data lie in that the data is used by people. In a big data scenario, various participants face their respective needs, providing data, analyzing data, giving full play to the value of the data, and acquiring data benefits in a decentralized network. There are two basic problems to realize trusted computing in this scenario: 1) the first problem is data security. Different from digital cashes in a financial scenario, the values of the data in the big data scenario lies in the data itself. Once the data is out of the control of a data owner, a data user may copy, process and disseminate the data at will, and give full play to the values of the data. However, the data owner loses the control over the data and cannot guarantee benefits thereof from the data. 2) The second problem is low execution efficiency. An efficiency of calling and executing smart contracts in a current blockchain platform depends on a synchronization efficiency of an underlying ledger. Because the current blockchain mostly employs a whole-network consensus synchronization mechanism, which also makes a smart contract execution efficiency of the traditional blockchain low. For example, Bitcoin can process about 6 transactions per second and Ethereum can process dozens of transactions per second, which are difficult to support large-scale data exchange and transaction.

SUMMARY

In light of the above problems, embodiments of the disclosure are proposed so as to provide a self-adaptive execution method for realizing data trustworthiness that overcome the above problems or at least partially solve the above problems.

In order to solve the foregoing problems, an embodiment of the disclosure provides a self-adaptive execution method for realizing data trustworthiness, wherein the method includes:

when any node in a pre-built P2P network receives a contract starting request sent by a client, by the node acting as a master node, starting a smart contract, and randomly selecting a plurality of slave nodes from the P2P network to enable the slave nodes to start the smart contract, wherein the smart contract is stored in a preset trusted distributed ledger;

generating, by the master node and the slave nodes, a set of public keys and private keys after starting the smart contract, and, by the slave nodes, returning the public keys in the public keys and private keys to the master node, and storing the private keys in the public keys and private keys locally;

by the master node, storing the public keys returned by all the slave nodes and meta-information of the smart contract into the trusted distributed ledger, and returning a hash value returned by the trusted distributed ledger as a contract verification address to the client;

when any node in the P2P network receives an execution request for the smart contract sent by the client, initiating, by the node acting as a requesting node, a call to the master node and all the slave nodes;

when the master node and all the slave nodes synchronously execute the execution request for the call, keeping synchronization of contract states, synchronization of contract execution sequences, synchronization of contract input data and synchronization of contract output data with each other, and returning corresponding execution results to the requesting node, the execution results including signatures of the master node and the slave nodes based on private keys thereof;

returning, by the requesting node, the received execution results to the client according to a preset result counting strategy; and by the client, acquiring the public keys from the contract verification address, and verifying the signatures in the execution results according to the public keys.

Optionally, the contract starting request includes a contract code address and an execution mode of the smart contract in the trusted distributed ledger, the execution mode includes a single-point execution mode or a multi-point execution mode, and the method further includes:

when the smart contract has been developed, by the client, saving the smart contract to the trusted distributed ledger, and taking the hash value returned by the trusted distributed ledger as the contract code address; and by the client, generating the contract starting request for the contract code address, and signing the contract starting request by using a private key thereof; and when any node in the pre-built P2P network receives the contract starting request sent by the client, by the node acting as the master node, starting the smart contract, and randomly selecting the plurality of slave nodes from the P2P network to enable the slave nodes to start the smart contract, wherein the smart contract is stored in the preset trusted distributed ledger, includes:

starting, by the master node and the slave nodes, the smart contract according to the contract code address and according to the execution mode.

Optionally, for the synchronization of contract states, the method further includes:

in the process of executing the execution request, recording, by each of the master node and all the slave nodes, execution of the smart contract according to a predetermined contract-execution recording strategy;

when any one of the master node and all the slave nodes fails or cannot call the smart contract synchronously, determining a target node currently in a latest state among the master node and all the slave nodes, and acquiring an execution record of the smart contract by the target node; and replaying the execution record of the smart contract by the target node in a new node or in a node which cannot synchronously call the smart contract, wherein the new node is a node randomly selected in the P2P network.

Optionally, when the contract-execution recording strategy is a transaction-based contract-execution recording strategy, a transaction record file is provided in each node;

in the process of executing the execution request, recording, by each of the master node and all the slave nodes, the execution of the smart contract according to the predetermined contract-execution recording strategy, includes:

in the process of executing the execution request, determining, by each of the master node and all the slave nodes, whether a new transaction request exists; and if a new transaction request exits, by the node, labeling a transaction corresponding to the transaction request, and writing parameters inputted when executing the transaction and used input/output I/O data into the transaction record file as a transaction record; and the replaying the execution record of the smart contract by the target node in the new node or in the node which cannot synchronously call the smart contract, wherein the new node is a node randomly selected in the P2P network, includes:

by the new node or the node which cannot synchronously call the smart contract, receiving a transaction record file of the target node, and determining whether the transaction record file of the target node has a next transaction record; and if a next transaction record exists, by the new node or the node which cannot synchronously call the smart contract, determining whether the transaction record is written into a local transaction record file, and executing the transaction according to the transaction record.

Optionally, when the contract-execution recording strategy is a heap-operation-based contract-execution recording strategy, a heap-operation record file is provided in each node;

in the process of executing the execution request, recording, by each of the master node and all the slave nodes, the execution of the smart contract according to the predetermined contract-execution recording strategy, includes:

in the process of calling the smart contract, determining, by each of the master node and all the slave nodes, whether a new transaction request exists;

if no new transaction request exists, by the node, deleting repeatedly assigned operations in the recorded heap operation, and then writing the remaining recorded heap operations into the heap-operation record file;

if a new transaction request exits, executing, by the node, the following steps:

determining whether a new heap operation has been generated;

if a new heap operation is generated, determining whether the heap operation is an operation on a local variable; and if the heap operation is not an operation on a local variable, recording the heap operation and continuing determining whether a new heap operation has been generated; and the replaying the execution record of the smart contract by the target node in the new node or in the node which cannot synchronously call the smart contract, wherein the new node is a node randomly selected in the P2P network, includes:

by the new node or the node which cannot synchronously call the smart contract, receiving a heap-operation record file of the target node, and determining whether the heap-operation record file of the target node has a next heap-operation record; and if a next heap-operation record exists, by the new node or the node which cannot synchronously call the smart contract, resolving the heap-operation record and executing a resolution result.

Optionally, when the contract-execution recording strategy is a heap-dump-based contract-execution recording strategy, a heap-dump record file is provided in the node; in the process of executing the execution request, recording, by each of the master node and all the slave nodes, the execution of the smart contract according to the predetermined contract-execution recording strategy, includes:

after executing the execution request for the smart contract, by each of the master node and all the slave nodes, acquiring all objects in the smart contract at a current moment, and determining whether an unresolved object exists among all the objects in the smart contract at the current moment;

if no unresolved object exists among all the objects in the smart contract at the current moment, writing, by the node, all the objects in the smart contract at the current moment into the heap-dump record file; and if an unresolved object exists among all the objects in the smart contract at the current moment, executing, by the node, the following steps:

determining, by the node, whether an unresolved attribute exists in the object;

if an unresolved attribute exists in the object, by the node, resolving the object and an attribute thereof, and after resolving, storing the object and the attribute thereof into a pre-created Map of the node; and if no unresolved attribute exists in the object, storing, by the node, the object into the Map.

Optionally, the replaying the execution record of the smart contract by the target node in the new node or in the node which cannot synchronously call the smart contract, wherein the new node is a node randomly selected in the P2P network, includes:

receiving, by the new node or the node which cannot synchronously call the smart contract, a heap-dump record file of the target node;

by the new node or the node which cannot synchronously call the smart contract, resolving the heap-dump record file of the target node, and storing contents in the heap-dump record file of the target node into the pre-created Map;

determining, by the new node or the node which cannot synchronously call the smart contract, whether an unrecovered object exits in the Map;

if an unrecovered object exists in the Map, creating, by the new node or the node which cannot synchronously call the smart contract, the object; and if no unrecovered object exists in the Map, by the new node or the node which cannot synchronously call the smart contract, determining whether an object with an unrecovered attribute exists in the Map, and, if an object with an unrecovered attribute exists in the Map, recovering the attribute of the object.

Optionally, for the synchronization of contract execution sequences, the method further includes:

sequencing, by the requesting node, the received execution request by using a Practical Byzantine Fault Tolerance PBFT algorithm, wherein in the PBFT algorithm, the execution request goes through the following stages:

REQUEST: the client sends the execution request to the requesting node;

PRE-PREPARE: the requesting node allocates a sequence number for the execution request, and broadcasts a PRE-PREPARE request to the master node and all the slave nodes;

PREPARE: after receiving the PRE-PREPARE request, the master node and all the slave nodes verify a correctness of the PRE-PREPARE request, and, if the PRE-PREPARE is verified to be correct, broadcast a PREPARE message, and record the PRE-PREPARE request and the PREPARE message to a local log;

COMMIT: if the master node and all the slave nodes receive more than (2f+1) valid PREPARE messages which are consistent with the master node and all the slave nodes, determining that the sequencing is successful, execute the execution requests of the sequenced smart contracts locally in sequence, sign the execution results by the private keys of the master node and all the slave nodes and then send the execution results to the requesting node; and REPLY: after the master node and all the slave nodes receive (2f+1) valid COMMIT messages consistent with the master node and all the slave nodes, executing the execution request locally, and send a REPLY message to the client through the requesting node; the client being used to confirm the execution results returned by the requesting node when receiving (f+1) valid REPLY messages which are inconsistent with the nodes.

Optionally, a plurality of smart contracts are provided, and for the synchronization of contract input data and the synchronization of contract output data, the method further includes:

de-duplicating, by the requesting node, redundant calls in the plurality of smart contracts for the execution request to ensure that external input and output are generated only once.

Optionally, the result counting strategy is ALL, MOST or FIRST, and the returning, by the requesting node, the received execution results to the client according to the preset result counting strategy, includes:

ALL: after the execution results of the master node and all the slave nodes are all returned, the requesting node returns the execution results to the client, and attaches abbreviations of the public keys of the master node and all the slave nodes;

MOST: after the requesting node receives the execution results of more than half of the nodes in the master node and all the slave nodes, the requesting node returns the execution results to the client, and attaches abbreviations of the public keys of the nodes already returning the execution results; and FIRST: after the requesting node receives the execution results returned by a first node in the master node and all the slave nodes, the requesting node returns the execution results to the client, and attaches abbreviations of the public keys of the node.

Compared with the prior art, the disclosure has the following advantages:

According to the embodiments of the disclosure, each activity in a life cycle of the data is abstracted as development, arrangement (start) and execution of the smart contract, and the execution results of the smart contract are verified, so that the trusted computing under a big data scenario is realized. In this process, a unique random multi-point execution mode is employed in the embodiments of the disclosure to improve a throughput and an execution efficiency of the trusted computing process, thereby better supporting high concurrency and high throughput data requirements of the big data scenario.

The embodiments of the disclosure further provides a contract-state self-adaptive synchronization method, wherein a needed execution record of contract calling is acquired from the node in a latest state and replayed locally when synchronization is needed by recording the execution of the contract in a process of synchronously calling the multiple nodes, so that a number of copies is ensured, and random multiple nodes can be quickly recovered when states of the random multiple nodes are not synchronized, thereby realizing high availability to satisfy a data analysis scenario with low response time.

DETAILED DESCRIPTION OF THE EMBODIMENTS

In order to make the above objects, features and advantages of the disclosure be more clearly understood, the disclosure will be described in further detail below with reference to the drawings and detailed description.

With respect to a problem of trusted computing in a big data scenario, traditional distributed systems generally focus on how to tolerate arbitrary Byzantine faults. Ethereum and other consensus-based cryptocurrencies make attack costs of perpetrators much higher than benefits through an incentive mechanism, thus making the perpetrators unprofitable and avoiding the Byzantine faults. Embodiments of the disclosure build a theoretical and trusted computing framework for the big data scenario, wherein the framework includes: 1) an access control layer, which models various participants and resources in the big data scenario from a perspective of software, abstracts various behaviors of the participants into developing, managing, running and calling of smart contracts, and guarantees security of resources such as data, equipment and algorithms by implementing corresponding access control mechanisms in a smart contract execution engine; and 2) an execution layer, which can ensure a correctness, an availability and a reliability of the smart contract, improve an execution efficiency of the smart contract, and reduce confirmation time of smart contract results by randomly allocating nodes for executing the smart contract in the whole network and through efficient state synchronization.

Figure 1:
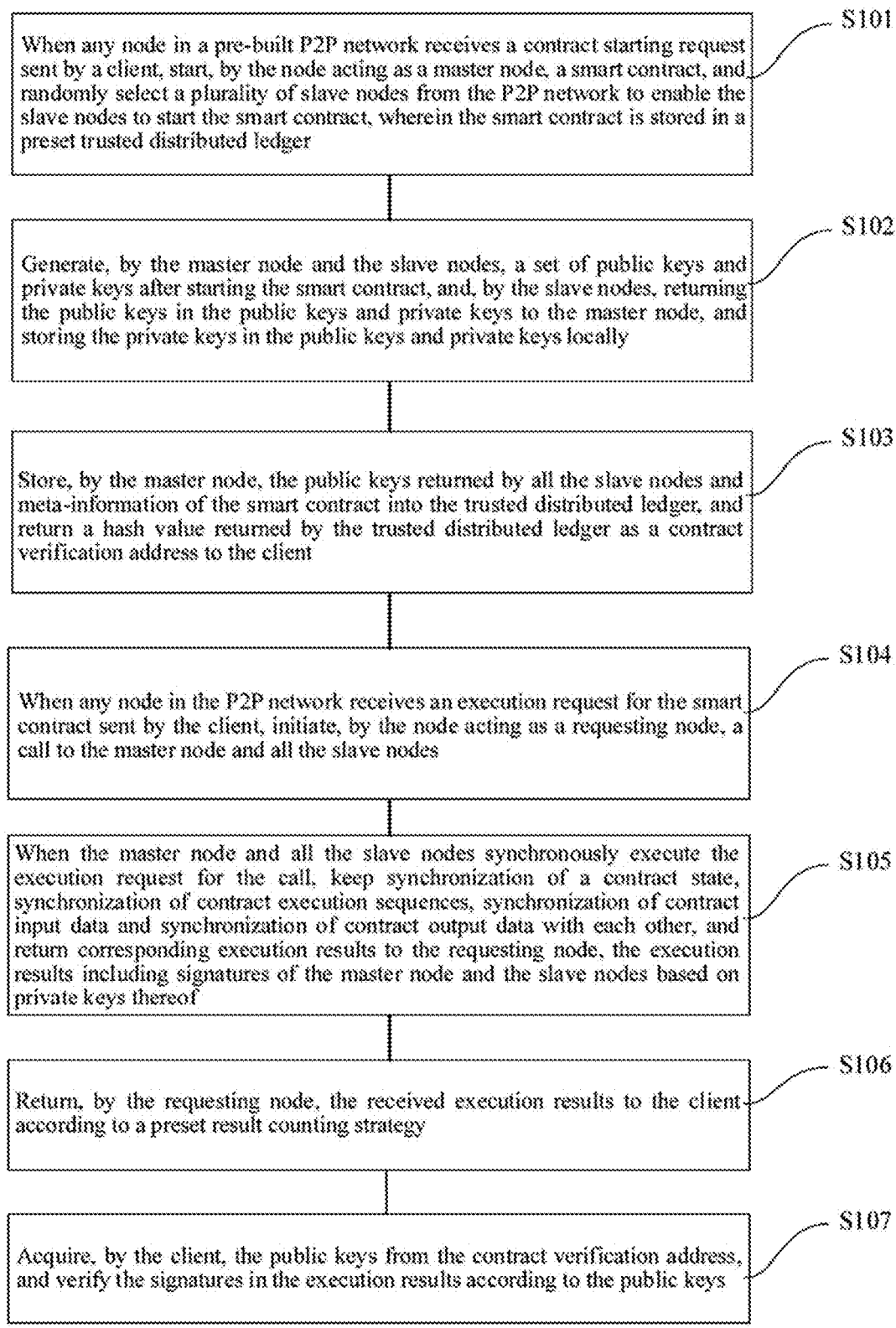
FIG. 1 is a flow chart of steps of a self-adaptive execution method for realizing data trustworthiness according to an embodiment of the disclosure.

FIG. 1 illustrates a flow chart of steps of a self-adaptive execution method for realizing data trustworthiness according to an embodiment of the disclosure, wherein the method may include the following steps:

Start of smart contract:

In step S101, when any node in a pre-built P2P network receives a contract starting request sent by a client, the node acting as a master node start the smart contract, and randomly selects a plurality of slave nodes from the P2P network to enable the slave nodes to start the smart contract, wherein the smart contract is stored in a preset trusted distributed ledger.

In the embodiment of the disclosure, all participants (including a data provider, a node provider and a data user) are connected through a P2P network first to form a network, and each node in the network corresponds to an ordinary personal computer or virtual machine. A data access smart contract and a data analysis smart contract run on the nodes in the network.

A method for acquiring the contract starting request is as follows: the client saves the smart contract to the trusted distributed ledger when the smart contract has been developed, and takes a hash value returned by the trusted distributed ledger as a contract code address; the client generates the contract starting request for the contract code address, and signs the contract starting request by using a private key thereof. In this process, the client mentioned in the embodiment of the disclosure may be understood as a data provider.

The master node is any node randomly selected by the client in the P2P network. After receiving the contract starting request, the master node may use a java.security.SecureRandom class of OracleJava™ Platform, Standard Edition 8 to randomly select the network nodes. A Cryptographically Secure Pseudo-Random Number Generator (CSPRNG) is employed in the algorithm. Compared with a linear congruential form employed by java.lang.Math.random( ), the random number generator has an extra pseudo-random attribute, which can ensure a randomness of the selected nodes and has a higher security. After multiple network nodes are selected to acquire a node list, the master node allocates a contract start message to all the nodes in the node list, i.e., the slave nodes referred to in the embodiment of the disclosure. And the slave nodes start the smart contract according to the contract starting request.

Since the contract starting request built by the user includes the contract code address and an execution mode of the smart contract in the trusted distributed ledger, the execution mode includes a single-point execution mode or a multi-point execution mode, the step S101 includes the following sub-step during concrete implementation:

the master node and the slave nodes start the smart contract according to the contract code address and according to the execution mode.

Figure 2:
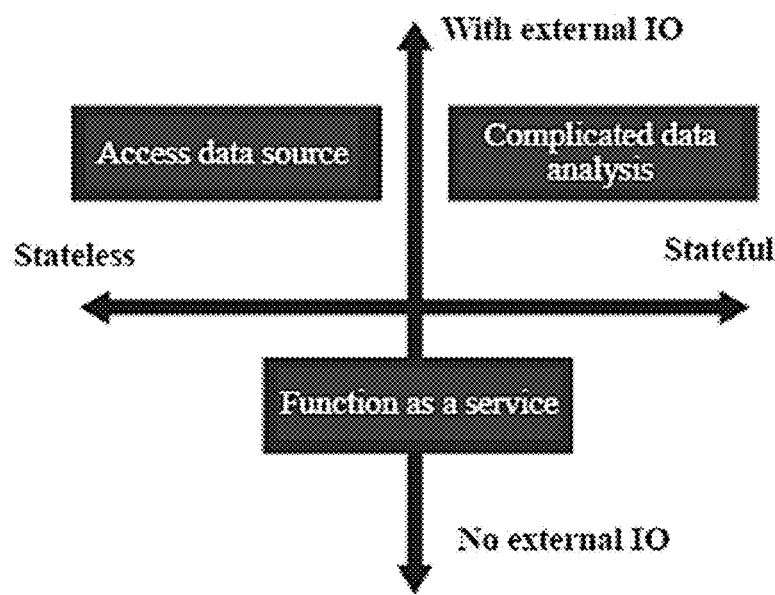
FIG. 2 is a schematic diagram illustrating classification of a smart contract according to the embodiment of the disclosure.

The single-point execution mode and the multi-point execution mode are suitable for different scenarios. Next, the scenarios may be divided into four scenarios as shown in FIG. 2 according to a computing state of the smart contract and a dimensionality whether there are external data input and output dimensions. The external data here refers to data accessed through a database, an API, a file, or the like. These data are different from data read directly from the distributed ledger or acquired by calling other smart contracts: the data read from the ledger and acquired by calling the smart contracts may realize the same data acquired for multiple times, while two identical queries on the data acquired by calling the API or the database may return completely different data. Therefore, the input and output of the external data makes the smart contracts inconsistent in a redundant execution process. A logic of this part cannot be executed and verified by multiple nodes to realize a verifiability of the returned results, and a certainty of a data source can only be guaranteed by signing. For the four scenarios, the embodiment of the disclosure guarantees a correctness of the returned results through the following mechanisms:

Stateless smart contracts with no external data input and output may be data analysis contracts issued by some data users to provide a function as a service, which are convenient for other data users to reuse algorithms thereof. Because these smart contracts are stateless and have no input and output, multi-node execution verification can be implemented to ensure a correctness of an output result as long as codes executed by each node are consistent.

Stateless smart contracts with external data input and output may be data access contracts issued by the data providers. For such contracts with input and output, a correctness of the input data cannot be realized by multi-point verification. Therefore, the embodiment of the disclosure guarantees a verifiability of a result source by signing the returned result.

Stateful smart contracts with no external data input and output may be data analysis contracts issued by some data users, and data sources for analysis may be data of data providers acquired through contract calling. Such smart contracts can guarantee an execution correctness of a contract logic through the multi-point execution mode, but state synchronization among "multiple nodes" needs to be realized. A typical Byzantine fault tolerant sequencing algorithm is used in the embodiments of the disclosure to determine an execution sequence of multi-node contracts.

Stateful smart contracts with external data input and output may be split into two smart contracts by simple code refactoring: logics related to the external input and output are written as a "data access contract", and the remaining stateful code logics complete data input and output by contract calling through the "data access contract". After refactoring, redundant execution of the "data access contract" can be implemented.

In step S102, the master node and the slave nodes generate a set of public keys and private keys after starting the smart contract, and, by the slave nodes, returning the public keys in the public keys and private keys to the master node, and storing the private keys in the public keys and private keys locally;

In step S103, the master node stores the public keys returned by all the slave nodes and meta-information of the smart contract into the trusted distributed ledger, and returns a hash value returned by the trusted distributed ledger as a contract verification address to the client.

In the above, the meta-information is information which describes information and the meta-information allows a server to provide information of the sent data. In the embodiment of the disclosure, in order to facilitate the calling of the smart contract, a contract address may be identified and resolved in a distributed manner through identification and resolution technologies such as a digital object system. A calling address of the contract is an identification, and information such as the contract verification address is stored in the identification. The identification and resolution system may be regarded as a high speed cache of ledger data, which can improve a contract addressing efficiency.

Execution of Smart Contract:

In step S104, when any node in the P2P network receives an execution request for the smart contract sent by the client, the node acting as a requesting node initiates a call to the master node and all the slave nodes.

In step S105, when the master node and all the slave nodes synchronously execute the execution request for the call, synchronization of a contract state, synchronization of contract execution sequences, synchronization of contract input data and synchronization of contract output data with each other are kept, and corresponding execution results are returned to the requesting node, the execution results including signatures of the master node and the slave nodes based on private keys thereof.

Verification of Execution Results of Smart Contract:

In step S106, the requesting node returns the received execution results to the client according to a preset result counting strategy.

In step S107, the client acquires the public keys from the contract verification address, and verifies the signatures in the execution results according to the public keys.

Figure 3:
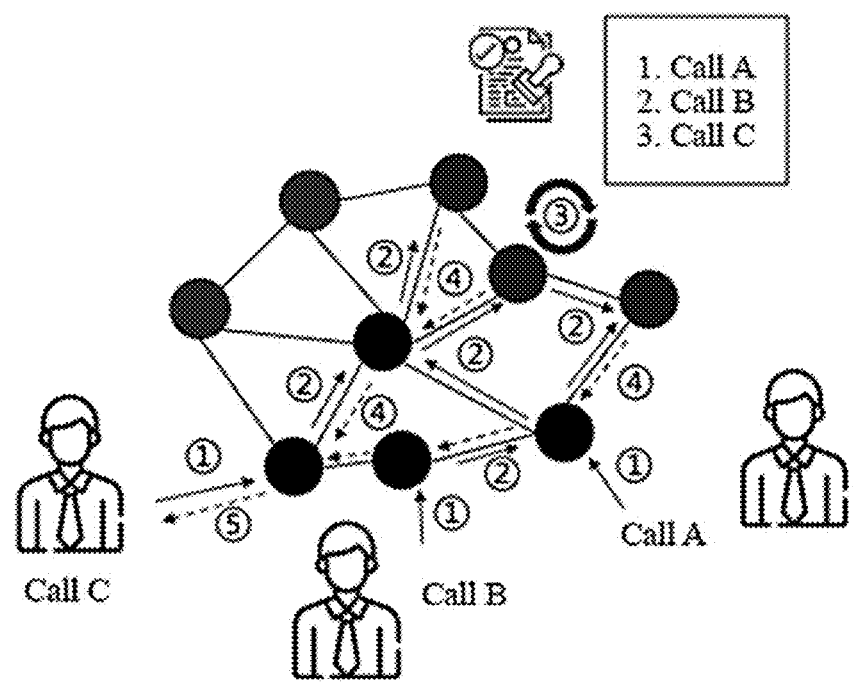
FIG. 3 is a schematic diagram illustrating random multi-point execution of the smart contract according to the embodiment of the disclosure.

In the embodiment of the disclosure, after the random multi-point smart contract is started, any node in the P2P network may be used as the requesting node to receive the execution request of the user, initiate to call the multi-point smart contract, verify the results, and return the results to the user. FIG. 3 illustrates a schematic diagram of execution of the random multi-point smart contract. In this way, an execution efficiency of the smart contract can be improved on the basis of realizing high concurrency and high availability of the smart contract, so as to better support data requirements of high concurrency and high throughput in the big data scenario.

Figure 4:
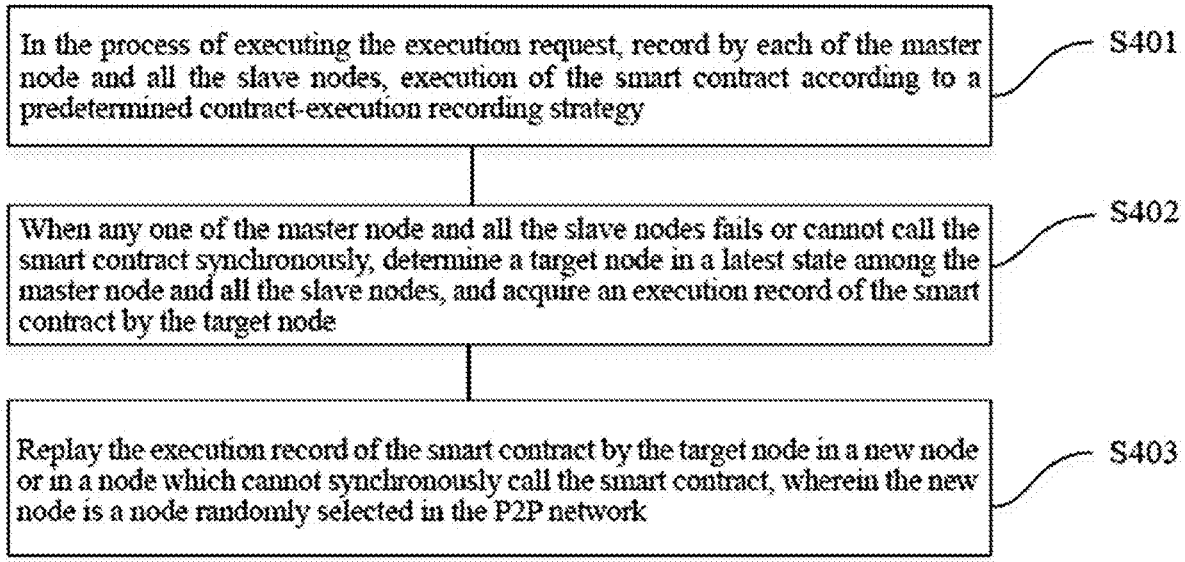
FIG. 4 is a flow chart of steps of a contract-state self-adaptive synchronization method according to the embodiment of the disclosure.

First, for the synchronization of contract states, considering that network partition, node downtime and other factors are big problems affecting the synchronous execution of multiple node states, and referring to FIG. 4, the embodiment of the disclosure further proposes a contract-state self-adaptive synchronization method, which may include the following steps.

In step S401, in the process of executing the execution request, each of the master node and all the slave nodes records execution of the smart contract according to a predetermined contract-execution recording strategy.

In step S402, when any one of the master node and all the slave nodes fails or cannot call the smart contract synchronously, a target node in a latest state among the master node and all the slave nodes is determined, and an execution record of the smart contract by the target node is acquired.

In step S403, the execution record of the smart contract by the target node is replayed in a new node or in a node which cannot synchronously call the smart contract, wherein the new node is a node randomly selected in the P2P network.

The above-mentioned failed node means that the node can no longer execute any smart contract, i.e., the node cannot call the smart contract, and the node is no longer available. At this time, it is necessary to re-select a node in the P2P network to replace the node, i.e., the new node mentioned in the embodiment of the disclosure. The node which cannot synchronously call the smart contract refers to a node that may suddenly have a short downtime, but can still call the smart contract.

In the embodiment of the disclosure, the self-adaptive synchronization method is realized by "recording-replaying". A main process is to record the execution of the contract during each contract calling. When synchronization is needed, the execution record of the needed contract calling is acquired from the node in the latest state and replayed locally. In this way, state migration of local contracts and state migration when the states between the nodes are not synchronized can be realized, and a preset number of nodes can be kept to run the same contract and realize quick response of the contract execution when the problems such as network partition and node downtime occur, and this is a main way to improve the reliability of the nodes. That is, for a certain node in a blockchain, the shorter the failure recovery time of a single node is, the higher the reliability and availability of the framework are.

During actual execution, each node may execute a plurality of smart contracts, i.e., an execution record list is stored in each node, wherein execution records of a plurality of smart contracts are recorded in the execution record list, and the execution records of smart contracts recorded in the execution record lists of different nodes may be partially different. Nodes needing to be synchronized (e.g., the new node or the node which cannot synchronously call the smart contract referred to in the embodiments of the disclosure) search an execution record of a target smart contract (smart contract needing to be synchronized) by the target node in an execution record list of the target node and extract the corresponding execution record.

In concrete implementation, the self-adaptive synchronization method of the embodiment of the disclosure selects the contract-execution recording strategy called this time according to the contexts before execution. The contract-execution recording strategy proposed by the embodiment of the disclosure includes three types: a transaction-based contract execution record, a heap-operation-based contract execution record and a heap-dump-based contract execution record. Each strategy has different characteristics and may be applied to different types of smart contracts.

Figure 5A:
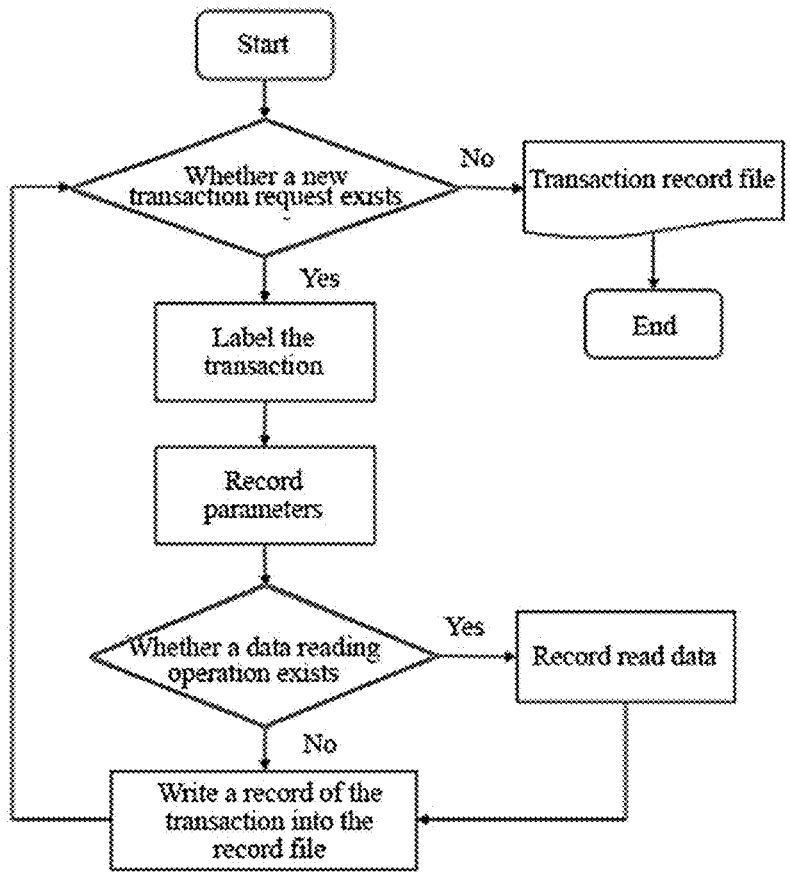
FIG. 5A is a flow chart illustrating execution recording of a transaction-based contract-execution recording strategy according to the embodiment of the disclosure.

In an optional embodiment of the disclosure, when the contract-execution recording strategy is a transaction-based contract-execution recording strategy, a transaction record file is provided in each node. As shown in FIG. 5A, the step S401 may include the following recording process:

in the process of executing the execution request, determining, by each of the master node and all the slave nodes, whether a new transaction request exists; and if a new transaction request exits, by the node, labeling a transaction corresponding to the transaction request, and writing parameters inputted when executing the transaction and used input/output I/O data into the transaction record file as a transaction record.

Figure 5B:
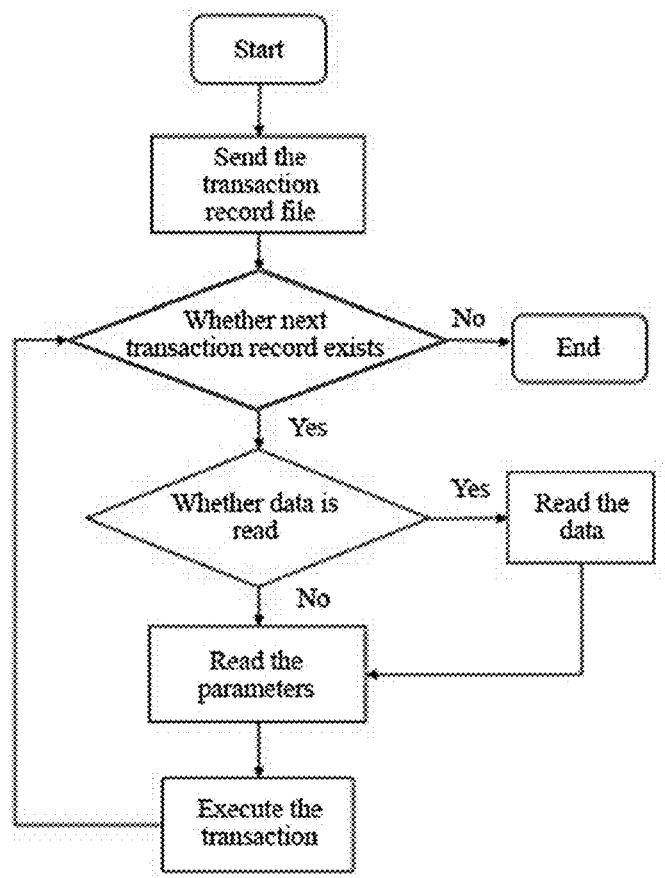
FIG. 5B is a flow chart illustrating execution replaying of the transaction-based contract according to the embodiment of the disclosure.

Base on the execution record of the strategy and referring to FIG. 5B, the S403 may include the following replaying process:

by the new node or the node which cannot synchronously call the smart contract, receiving a transaction record file of the target node, and determining whether the transaction record file of the target node has a next transaction record; and if a next transaction record exists, by the new node or the node which cannot synchronously call the smart contract, determining whether the transaction record is written into a local transaction record file, and executing the transaction according to the transaction record.

Figure 6A:
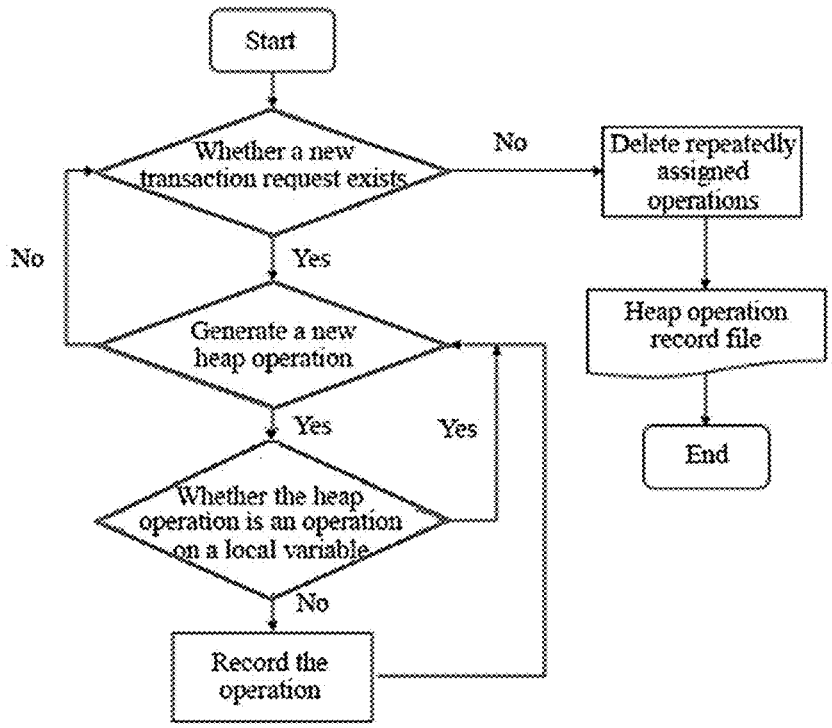
FIG. 6A is a flow chart illustrating execution recording of a heap-operation-based contract according to the embodiment of the disclosure.

In an optional embodiment of the disclosure, when the contract-execution recording strategy is a heap-operation-based contract-execution recording strategy, a heap-operation record file is provided in each node. As shown in FIG. 6A, the step S401 may include the following recording process:

in the process of calling the smart contract, determining, by each of the master node and all the slave nodes, whether a new transaction request exists;

if no new transaction request exists, by the node, deleting repeatedly assigned operations in the recorded heap operation, and then writing the remaining recorded heap operations into the heap-operation record file; and if a new transaction request exits, executing, by the node, the following steps:

determining whether a new heap operation has been generated;

if a new heap operation is generated, determining whether the heap operation is an operation on a local variable; and if the heap operation is not an operation on a local variable, recording the heap operation and continuing determining whether a new heap operation has been generated.

Figure 6B:
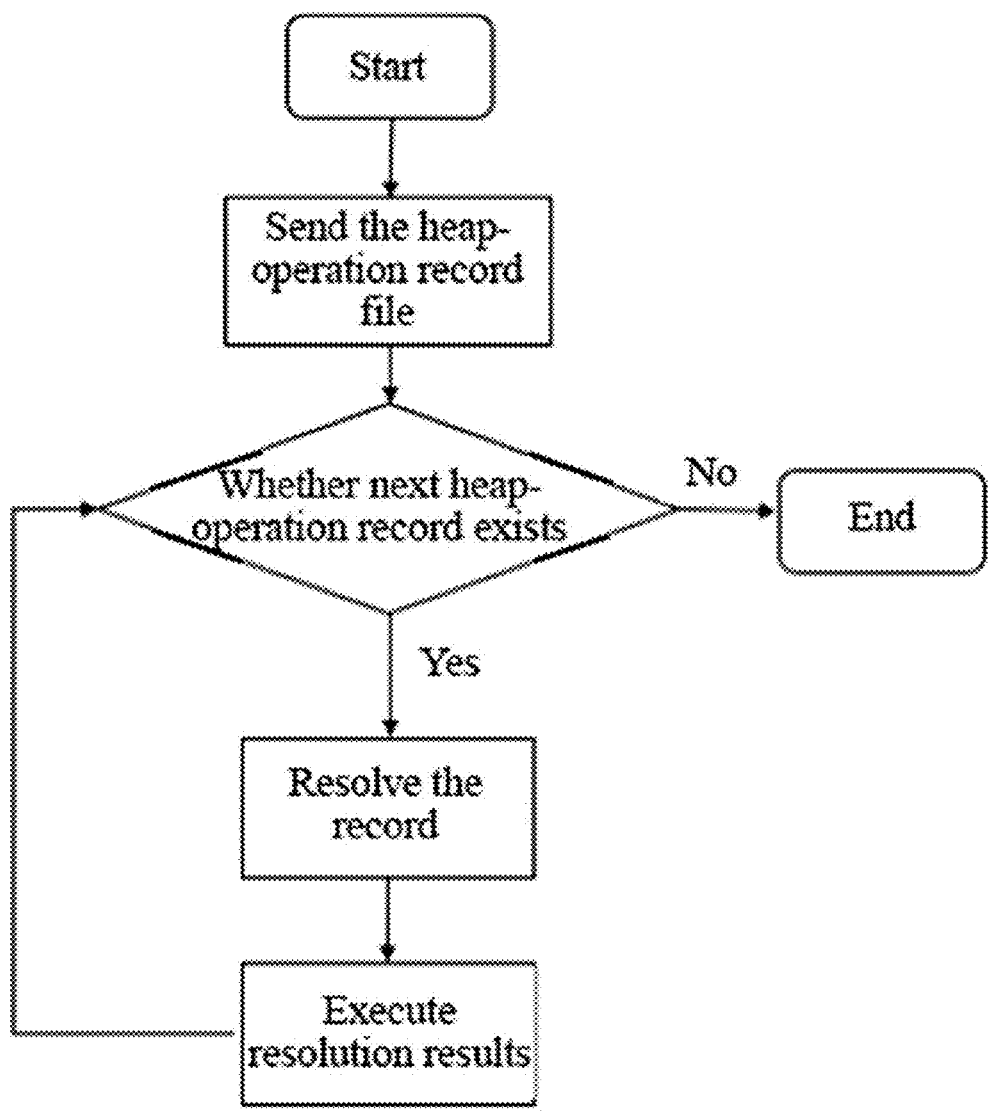
FIG. 6B is a flow chart illustrating execution replaying of the heap-operation-based contract according to the embodiment of the disclosure.

When contract state synchronization is performed by using a heap-operation-based state synchronization algorithm, as shown in FIG. 6B, the step S403 may include the following replaying process:

by the new node or the node which cannot synchronously call the smart contract, receiving a heap-operation record file of the target node, and determining whether the heap-operation record file of the target node has a next heap-operation record; and if a next heap-operation record exists, by the new node or the node which cannot synchronously call the smart contract, resolving the heap-operation record and executing a resolution result.

Figure 7A:
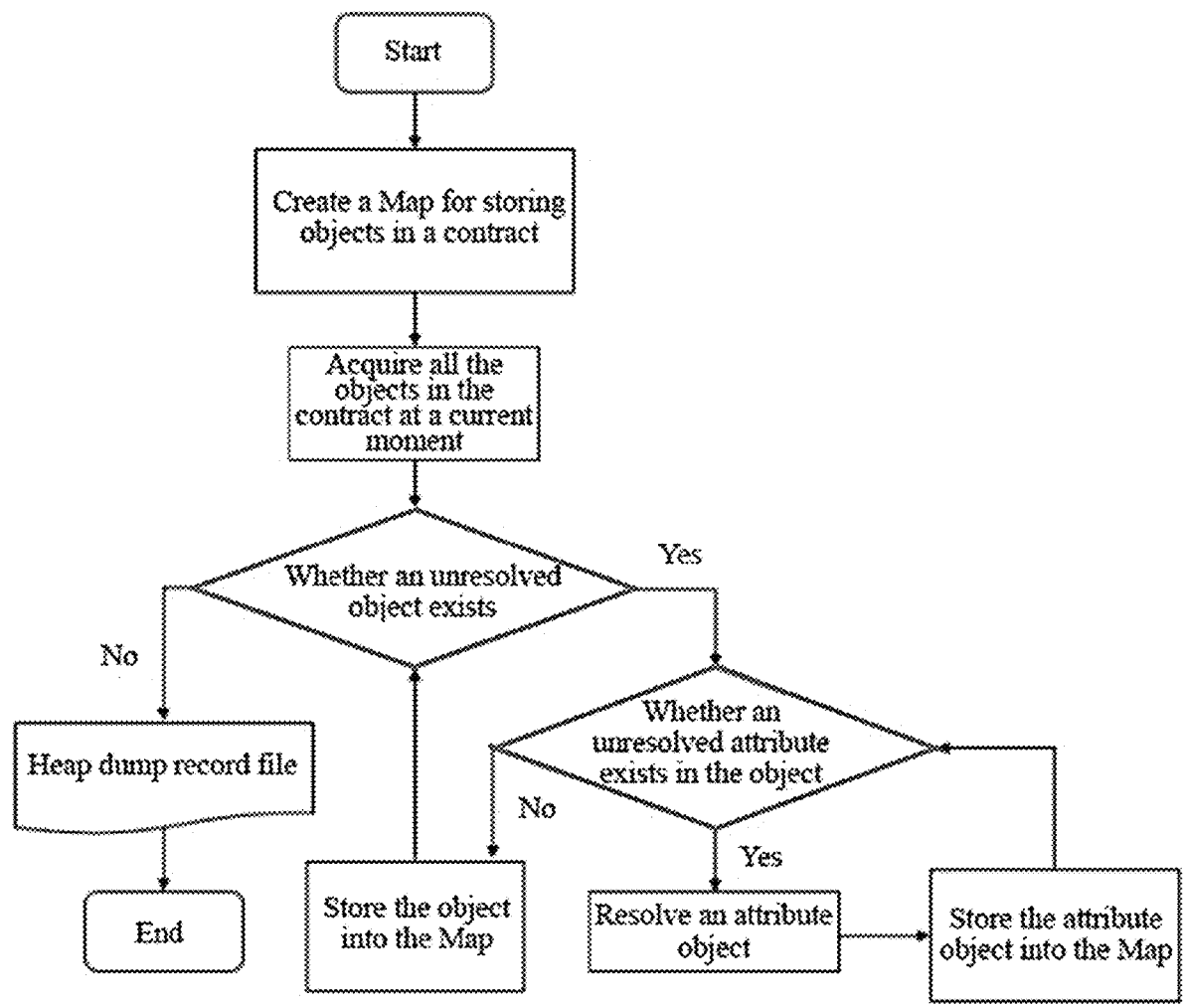
FIG. 7A is a flow chart of recording execution of a heap-dump-based contract according to the embodiment of the disclosure.
Figure 7B:
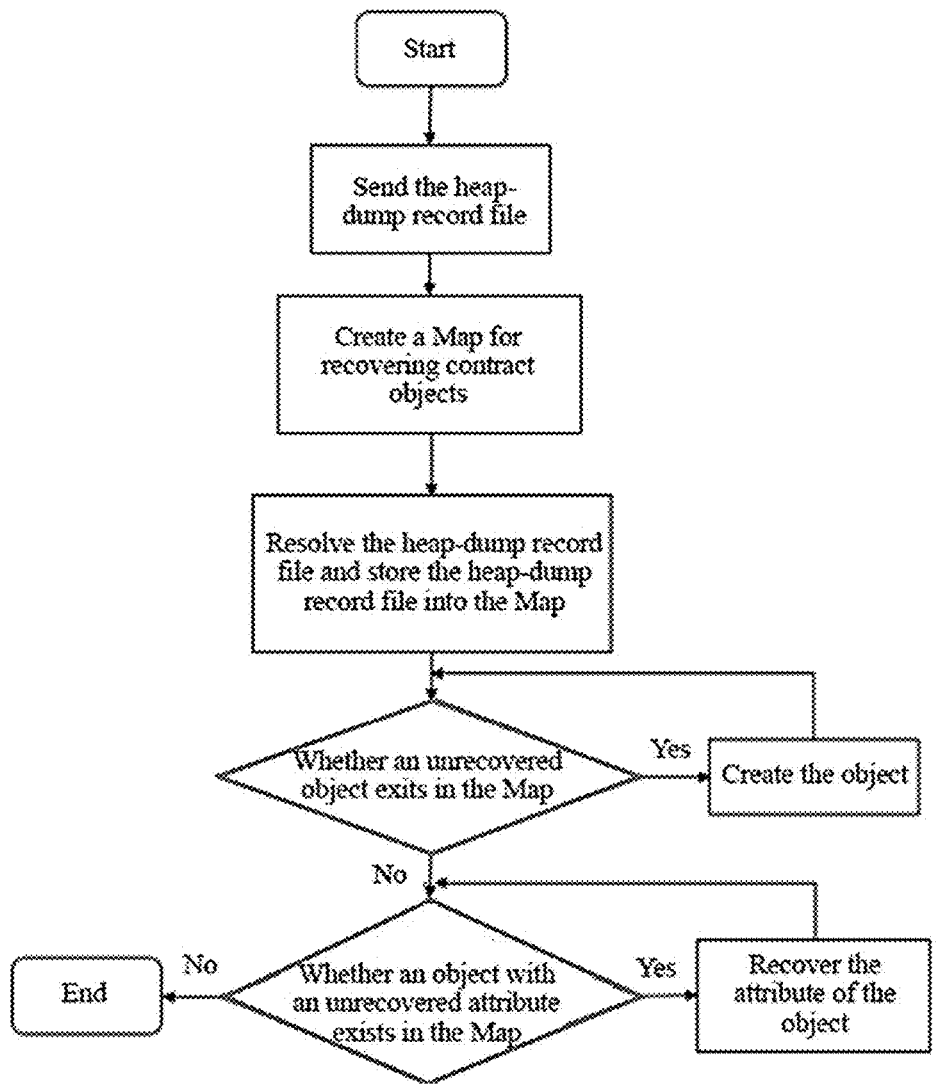
FIG. 7B is a flow chart illustrating execution replaying of the heap-dump-based contract according to the embodiment of the disclosure.

In an optional embodiment of the disclosure, when the contract-execution recording strategy is a heap-dump-based contract-execution recording strategy, a heap-dump record file is provided in the node. As shown in FIG. 7A, the step S401 may include the following recording process:

after executing the execution request for the smart contract, by each of the master node and all the slave nodes, acquiring all objects in the smart contract at a current moment, and determining whether an unresolved object exists among all the objects in the smart contract at the current moment;

if no unresolved object exists among all the objects in the smart contract at the current moment, writing, by the node, all the objects in the smart contract at the current moment into the heap-dump record file; and if an unresolved object exists among all the objects in the smart contract at the current moment, executing, by the node, the following steps:

determining, by the node, whether an unresolved attribute exists in the object;

if an unresolved attribute exists in the object, by the node, resolving the object and an attribute thereof, and after resolving, storing the object and the attribute thereof into a pre-created Map of the node; and if no unresolved attribute exists in the object, writing, by the node, the object into the Map.

A heap-dump-based synchronization method is divided into two stages when synchronizing the contract state: restoring each object in the contract, and restoring the attributes of the objects with attributes. As shown in FIG. 7A, the step S403 may include the following replaying process:

receiving, by the new node or the node which cannot synchronously call the smart contract, a heap-dump record file of the target node;

by the new node or the node which cannot synchronously call the smart contract, resolving the heap-dump record file of the target node, and storing contents in the heap-dump record file of the target node into the pre-created Map;

determining, by the new node or the node which cannot synchronously call the smart contract, whether an unrecovered object exits in the Map;

if an unrecovered object exists in the Map, creating, by the new node or the node which cannot synchronously call the smart contract, the object; and if no unrecovered object exists in the Map, by the new node or the node which cannot synchronously call the smart contract, determining whether an object with an unrecovered attribute exists in the Map, and, if an object with an unrecovered attribute exists in the Map, recovering the attribute of the object.

Figure 8:
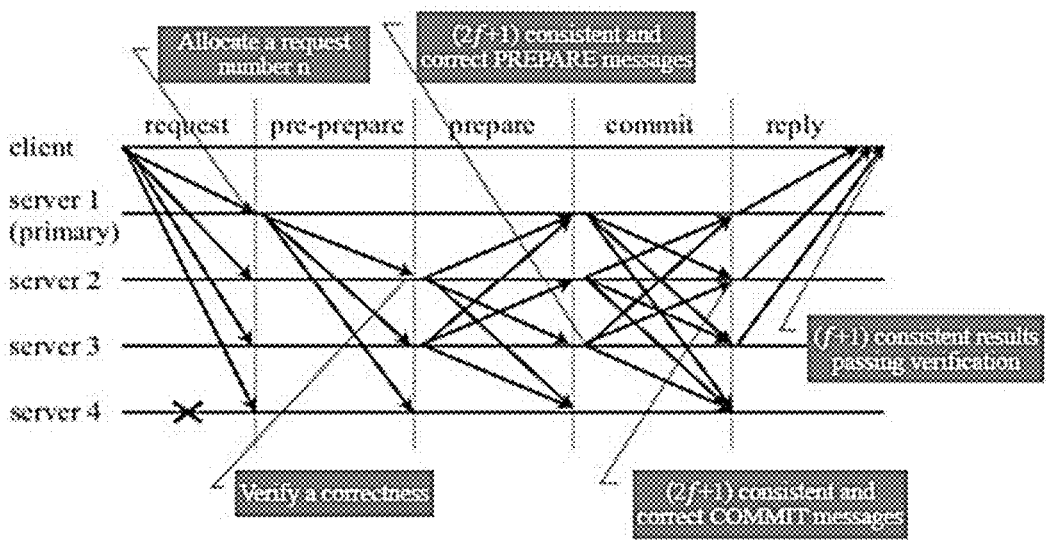
FIG. 8 is a schematic diagram of a PBFT algorithm.

Second, for the synchronization of contract execution sequences, a Practical Byzantine Fault Tolerance PBFT algorithm is employed by the requesting node in the embodiment of the disclosure to sequence the received execution requests. PBFT is a state machine replica replication algorithm, in which all replicas operate in a view rotation process, and the master node is determined by a view number and a node number set:

$$p = v \bmod |R| \qquad \text{formula (1)};$$

wherein v is the view number, |R| is the node number, and p is a master node number. In one view, a flow of the PBFT algorithm is shown in FIG. 8. In the PBFT algorithm, each execution request goes through the following stages:

REQUEST: the client sends the execution request to the requesting node;

PRE-PREPARE: the requesting node allocates a sequence number for the execution request, and broadcasts a PRE-PREPARE request to the master node and all the slave nodes;

PREPARE: after receiving the PRE-PREPARE request, the master node and all the slave nodes verify a correctness of the PRE-PREPARE request, and, if the PRE-PREPARE is verified to be correct, broadcast a PREPARE message, and record the PRE-PREPARE request and the PREPARE message to a local log;

COMMIT: if the master node and all the slave nodes receive more than (2f+1) valid PREPARE messages which are consistent with the master node and all the slave nodes, determining that the sequencing is successful, execute the execution requests of the sequenced smart contracts locally in sequence, sign the execution results by the private keys of the master node and all the slave nodes and then send the execution results to the requesting node; and REPLY: after the master node and all the slave nodes receive (2f+1) valid COMMIT messages consistent with the master node and all the slave nodes, executing the execution request locally, and send a REPLY message to the client through the requesting node; the client being used to confirm the execution results returned by the requesting node when receiving (2f+1) valid REPLY messages which are inconsistent with the nodes.

A plurality of smart contracts are provided, and for the synchronization of contract input data and the synchronization of contract output data, the embodiment of the disclosure provides the following method:

de-duplicating, by the requesting node, redundant calls in the plurality of smart contracts for the execution request to ensure that external input and output are generated only once, thus ensuring that all the random nodes (the master node and all the slave nodes) use the same data, and also avoiding the problem of redundant data reading and writing.

In order to further satisfy the trade-off between two incompatible factors including the correctness and the execution efficiency, a configurable execution result counting strategy is also employed in the random multi-point mode of the smart contract to satisfy specific requirements of different types of contracts and users with different needs, as shown in step S106 to step S107. The result counting strategy according to the embodiment of the disclosure is divided into ALL, MOST or FIRST, and the returning, by the requesting node, the received execution results to the client according to the preset result counting strategy, includes:

ALL: after the execution results of the master node and all the slave nodes are all returned, the requesting node returns the execution results to the client, and attaches abbreviations of the public keys of the master node and all the slave nodes;

MOST: after the requesting node receives the execution results of more than half of the nodes in the master node and all the slave nodes, the requesting node returns the execution results to the client, and attaches abbreviations of the public keys of the nodes already returning the execution results; and FIRST: after the requesting node receives the execution results returned by a first node in the master node and all the slave nodes, the requesting node returns the execution results to the client, and attaches abbreviations of the public keys of the node.

After receiving the execution result, the client may acquire the corresponding public key from the contract verification address through the abbreviations of the public keys, because the private key in the public keys and private keys is only owned by the node and is used for data signature and the public key is owned by all the nodes, which is used to check a credibility of the data. Therefore, the nodes cannot disguise as other nodes to send the messages to interfere with the statistics of the results, so that the execution results can be verified under a relatively distrusted environment while ensuring the execution efficiency.

Effect Evaluation (I) Evaluation of Execution Efficiency

In order to evaluate the efficiency of the random multi-point smart contract, the embodiment of the disclosure tests running speeds of a single-point smart contract, random one-node smart contract and random four-node smart contract. 12 types of contracts are employed, including a simple data analysis contract, a Http access contract, a database access contract, an event publishing contract, an event subscription contract, a contract-calling contract, a complicated data processing contract, or the like. An Apache Jmeter tool is used in the test to send a HTTP request; after an effective result is received, the time elapsed thereby is recorded.

1. Start Test of Random Multi-Point Smart Contract

Start speeds of the smart contracts (in ms) under the following conditions are respectively tested:

sending 12 different single-point smart contract starting requests to the same node;

sending 12 different random one-node smart contract starting requests to the same node; and sending 12 different random four-node smart contract starting requests to the same node;

randomly sending 12 different random four-node smart contract starting requests to four nodes in total.

Figure 9:
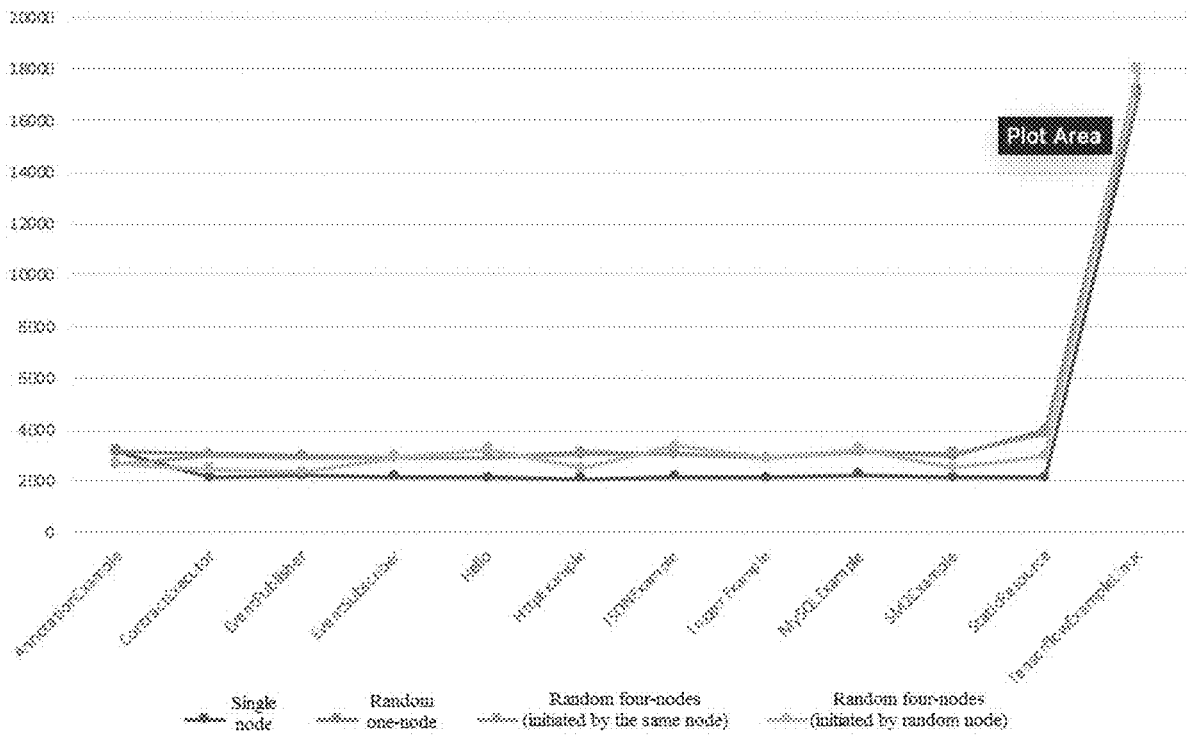
FIG. 9 is a schematic diagram illustrating random multi-point start test of the smart contract.

Test results are shown in FIG. 9. It can be seen from the above figure that the start speed of the random multi-point smart contract descends a little in comparison to that of the smart contract of the single-point execution mode, but the descending range is not obvious. Moreover, the start speed of the random multi-point smart contract has little change with the increase of the number of nodes.

2. Execution Test of Random Multi-Point Smart Contract

Start speeds of the smart contracts (in ms) under the following conditions are respectively tested:

concurrently sending 48 different single-point smart contract execution request to the same node;

concurrently sending 48 different random one-node smart contract starting requests to the same node;

concurrently sending 12 different random four-node smart contract starting requests to random nodes, wherein there are 48 processes in total, and the result verification mode is "All";

concurrently sending 12 different random four-node smart contract starting requests to random nodes, wherein there are 48 processes in total, and the result verification mode is "MOST"; and concurrently sending 12 different random four-node smart contract starting requests to random nodes, wherein there are 48 processes in total, and the result verification mode is "FIRST".

Figure 10:
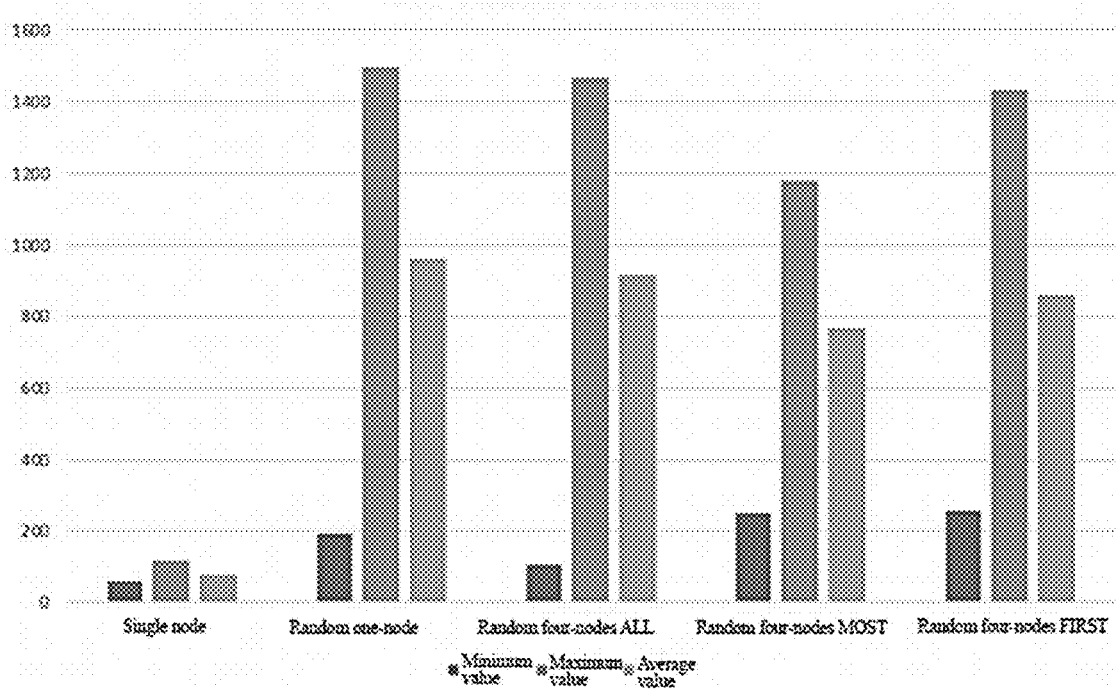
FIG. 10 is a schematic diagram illustrating random multi-point execution test of the smart contract.

A statistical histogram of all the results is shown in FIG. 10. It can be seen by observing the test data that the single-point smart contract execution is the fastest, which can be completed in 78 ms on average; the execution speed of the random multi-point smart contract obviously decreases, which is completed in 800 ms on average, but is still within an acceptable range of users.

3. Test of Sequencing Algorithm

Figures 11, 12:
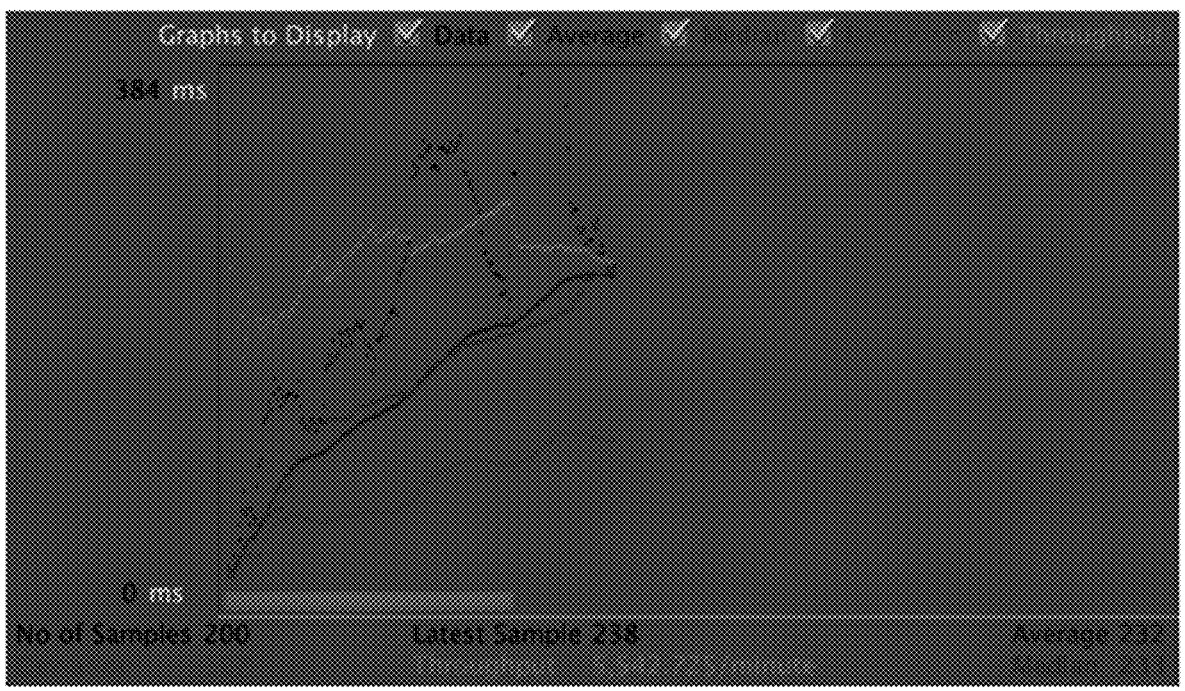
FIG. 11 is a schematic diagram of sequencing test results.
FIG. 12 is a statistical diagram of a PBFT sequencing test.

A cluster composed of four nodes is similarly used to test (in ms) a sequencing speed of the PBFT among nodes based on a UDP communication protocol. In the test, 50 sequencing requests are concurrently sent to four nodes, i.e., 200 requests in total. Results of the sequencing test results and a statistical diagram of the PBFT sequencing test are respectively shown in FIG. 11 and FIG. 12. Upon testing, a total response time is 2.166 s, an average response time is 0.232 s, and a total time to sequence the transaction and return the sequencing result is 2.559 s.

In summary, the results show that a trusted execution efficiency of the embodiment of the disclosure can implement a second-level confirmation time and a second-level response time.

(II) Evaluation of State Synchronization

According to the embodiment of the disclosure, three different algorithms for state synchronization are respectively evaluated in different types of contracts. A size of a memory space required by a transaction-based synchronization algorithm for state synchronization is represented by a size of a file used by the algorithm for recording contract transactions, a size of a memory space required by a heap-dump-based synchronization algorithm for contract state synchronization is represented by a size of a file used by the algorithm for recording contract states, and a size of a memory space required by a heap-operation-based synchronization algorithm for state synchronization is represented by a size of a file used by the algorithm for recording contract heap operations. The embodiment of the disclosure selects typical smart contracts such as a coin issuing contract BDCoin conforming to ERC-20 (ERC-20, 2020) and an image identifying contract ImageMatcher based on Tensorflow, covering typical smart contract types such as memory intensive and CPU intensive smart contracts, and carries out the following evaluation, wherein the smart contracts used in the evaluation are shown in Table 1.

TABLE 1

| Contract name | Type | Order |
|---|---|---|
| TimeCalculator | CPU/IO/memory non-intensive | Return a total number of calls |
| BDCoin | Memory intensive | Coin issuing contract conforming to ERC-20 |
| ImageMatcher | CPU intensive contract | Use a Tensorflow model to identify articles in the image |

(I) Simple Smart Contract

Figure 13A:
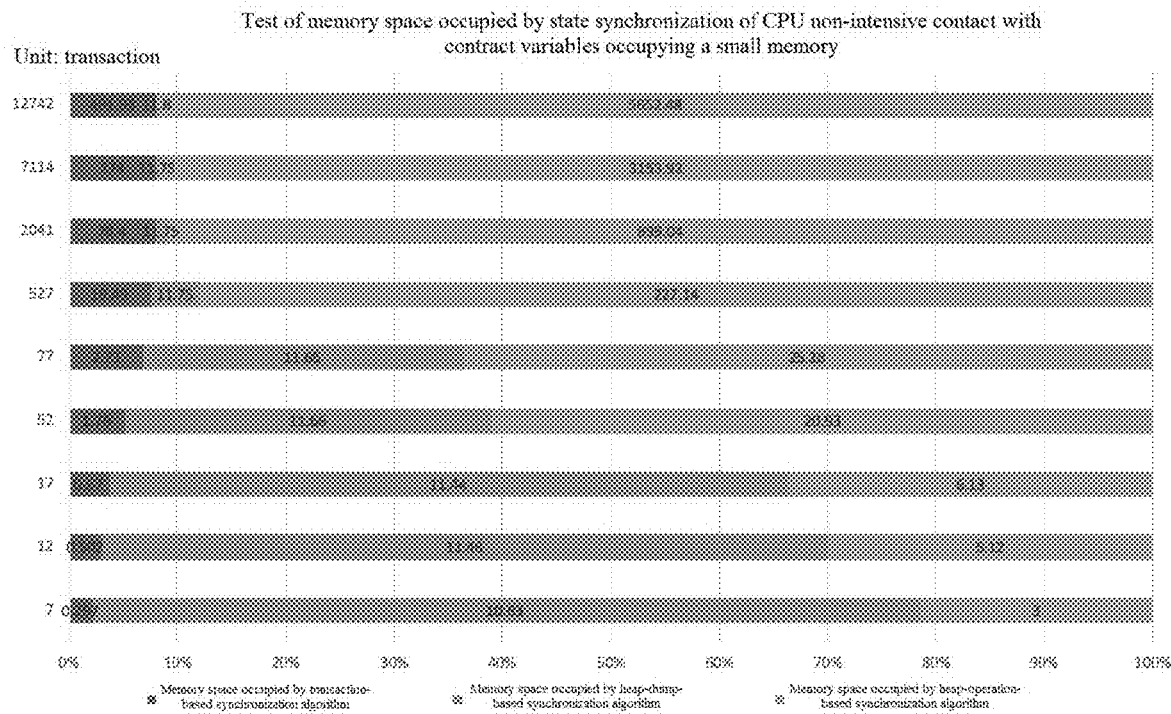
FIG. 13A is a schematic diagram illustrating memory occupancy of a TimeCalculator contract using different strategies.

A TimeCalculator contract is used in the embodiment of the disclosure to evaluate. This contract accepts arbitrary parameters and returns the total number of calls, belonging to a CPU non-intensive contract with contract variables occupying a small memory. As the number of transactions increases, the memory space required by the three strategies is shown in FIG. 13A.

Figure 13B:
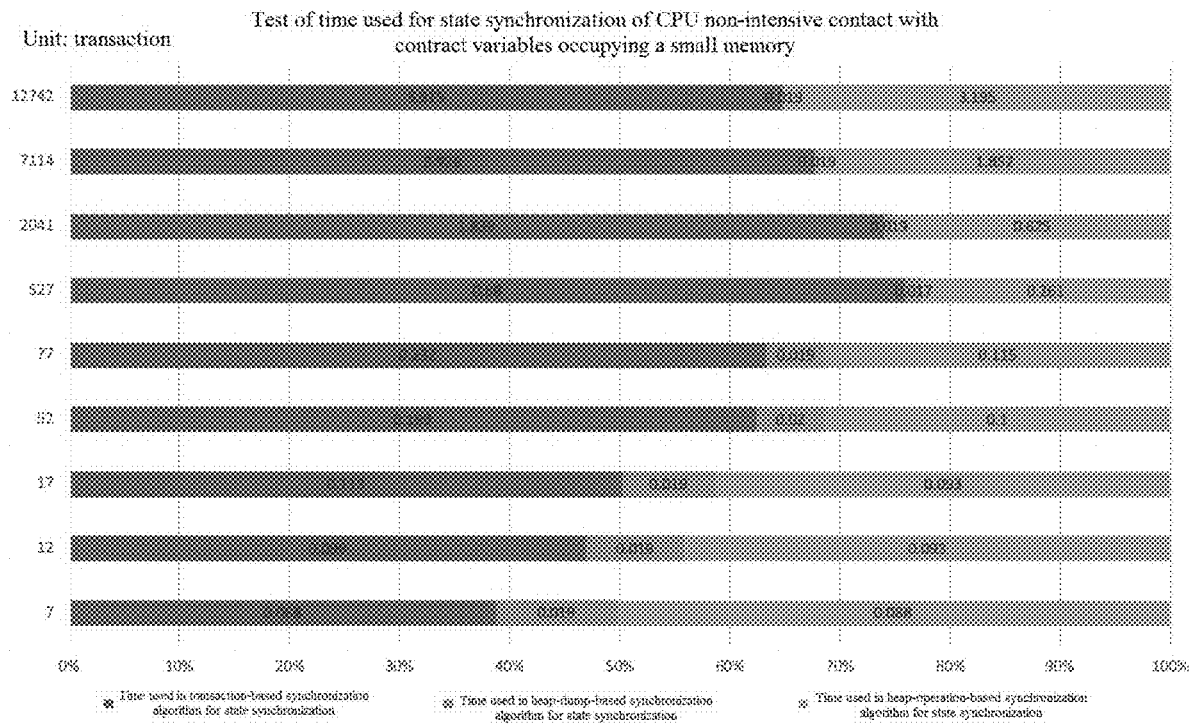
FIG. 13B is a schematic diagram illustrating replaying time of the TimeCalculator contract using different strategies.

As the number of transactions increases, the time required by the three strategies is shown in FIG. 13B. It can be seen from FIG. 13B that the memory space required by the heap-dump-based strategy is the largest when the number of transactions is small. With the increase of the number of transactions, the size of the memory space required by the heap-operation-based strategy increases rapidly, and both the size of the memory space required by the heap-operation-based synchronization algorithm and the size of the memory space required by the transaction-based synchronization algorithm are larger than the size of the memory space required by the heap-dump-based synchronization algorithm. Although the heap-operation-based synchronization algorithm is faster than the transaction-based synchronization algorithm in performing state synchronization, the memory space required by the heap-operation-based synchronization algorithm is much larger than that of the transaction-based synchronization algorithm. Therefore, for the CPU non-intensive contract with contract variables occupying a small memory, it is better to employ the heap-dump-based algorithm for state synchronization.

(II) Memory Intensive Contract

Figure 14A:
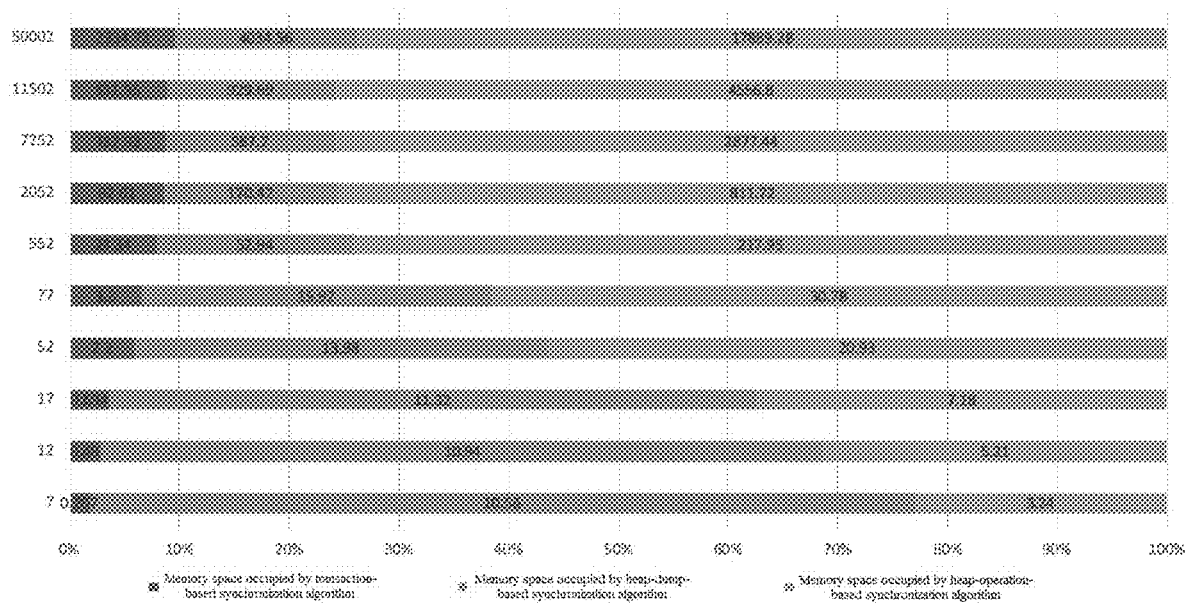
FIG. 14A is a schematic diagram illustrating memory occupancy of a BDCoin smart contract using different strategies.

A BDCoin smart contract is used in the embodiment of the disclosure to evaluate. Memory occupation of the smart contract will increase with the increase of account numbers created. The memory space required by the three strategies is shown in FIG. 14A.

Figure 14B:
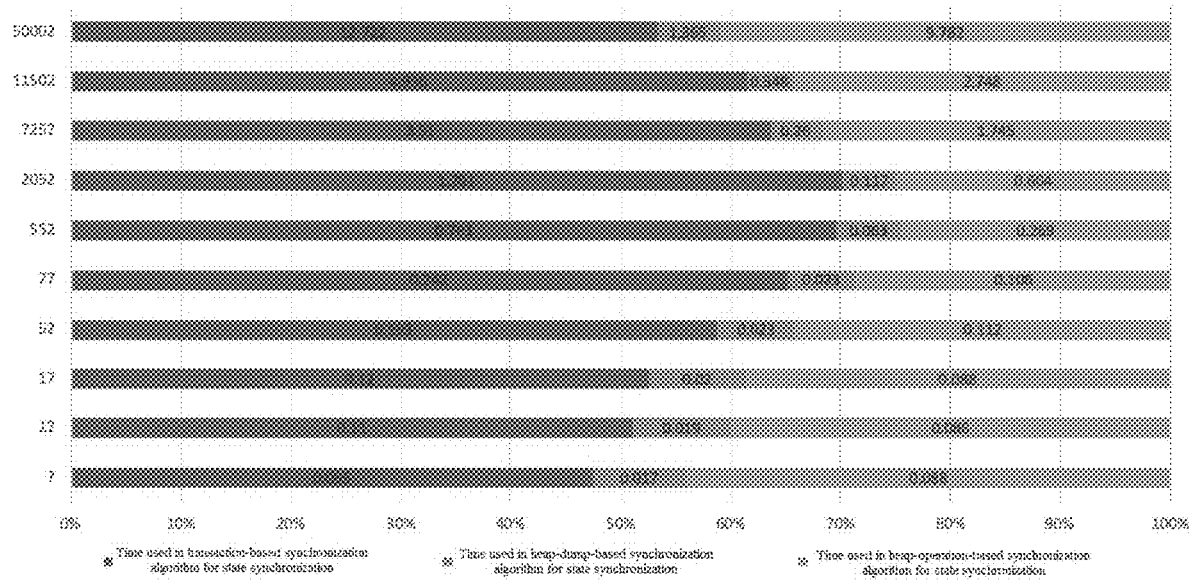
FIG. 14B is a schematic diagram illustrating replaying time of the BDCoin smart contract using different strategies.

As the number of transactions increases, the replaying time required by the three strategies is shown in FIG. 14B. It can be seen from the data in FIG. 14B that for this type of contract, the memory space occupied by the heap-dump-based synchronization algorithm is no longer the smallest. When a transaction volume is small, the heap-operation-based synchronization algorithm and the transaction-based synchronization algorithm need a smaller memory space, and the time used by the heap-operation-based synchronization algorithm for state synchronization is shorter than that of the transaction-based synchronization algorithm, so the heap-operation-based synchronization algorithm may be employed for synchronization. When the transaction volume increases, although the time used by heap-operation-based synchronization algorithm is shorter than that of the transaction-based synchronization algorithm, the memory space needed is larger. Therefore, for the memory intensive contract, the transaction-based synchronization algorithm or the heap-dump-based synchronization algorithm may be employed for state synchronization.

(III) CPU Intensive Contract

Figure 15A:
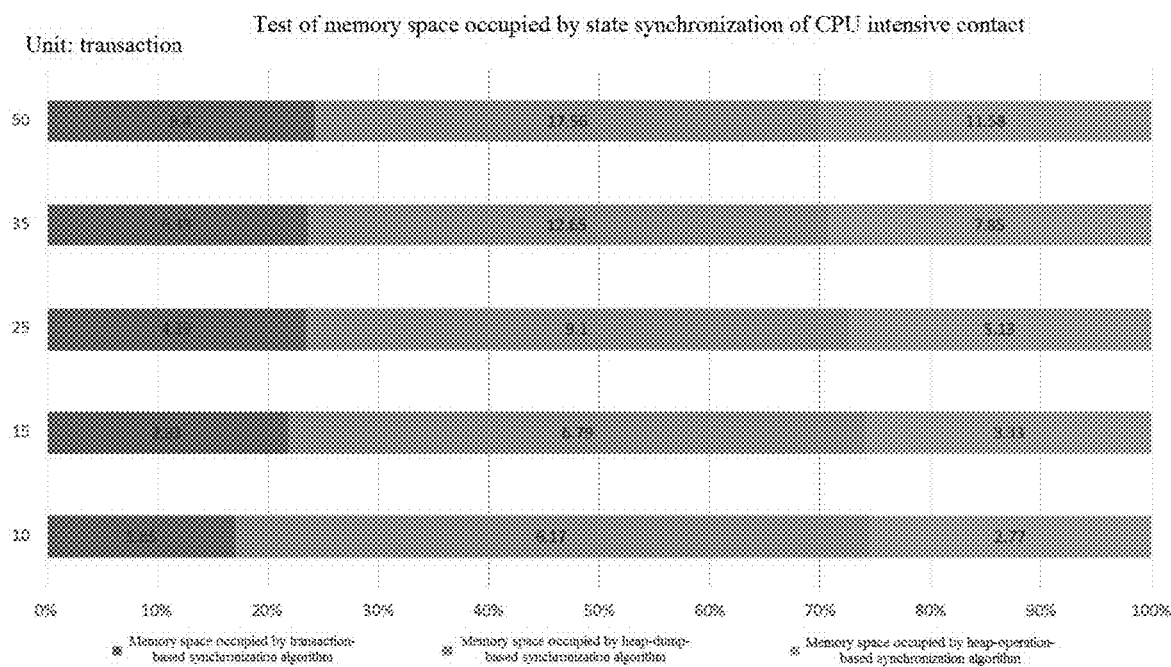
FIG. 15A is a schematic diagram illustrating memory occupancy of an ImageMatcher smart contract using different strategies.
Figure 15B:
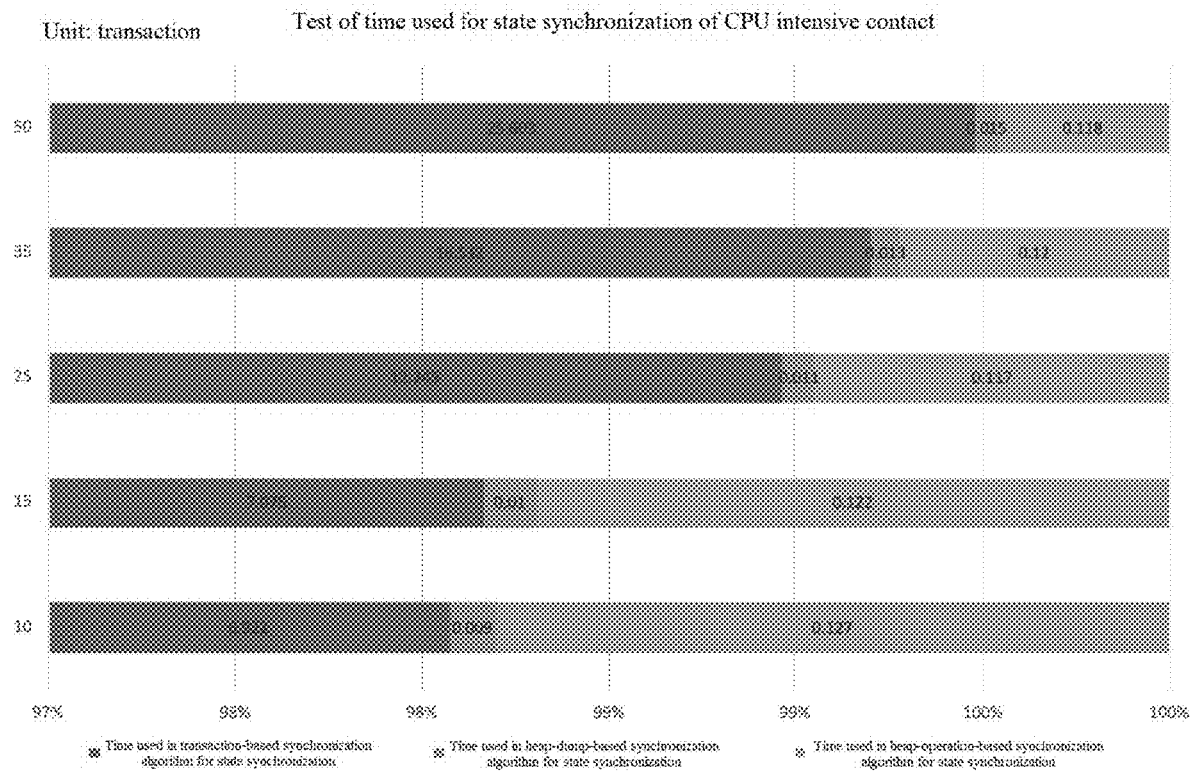
FIG. 15B is a schematic diagram illustrating replaying time of the ImageMatcher smart contract using different strategies.

An ImageMatch smart contract is used in the embodiment of the disclosure to evaluate. As the number of transactions increases, the memory space required by the three algorithms is shown in FIG. 15A.

As the number of transactions increases, the time required by the three algorithms for synchronization is shown in FIG. 16(b). For this type of contract, the time used in the heap-dump-based synchronization algorithm and the time used in the heap-operation-based synchronization algorithm for state synchronization have little difference, and both are far shorter than that of the transaction-based synchronization algorithm. The memory space occupied by the heap-operation-based synchronization algorithm is smaller than that of the heap-dump-based synchronization algorithm. Therefore, the heap-operation-based synchronization algorithm and the heap-dump-based synchronization algorithm are preferably used for the CPU intensive contract. Through comparative analysis of the three state synchronization algorithms in time and space in different types of contracts, it is found that choosing the most suitable algorithm for state synchronization for different types of contracts can better save space and time costs.

In conclusion, the above results show that the synchronization efficiency of the embodiment of the disclosure can reach a minute level for different types of smart contracts.

The embodiments in the disclosure are all described step by step, the important part of each embodiment mainly lies in the difference between other embodiments, the same or similar part between each embodiment may be referred to each other.

For the sake of simple description, the method embodiments are all expressed as a series of action combinations, but those skilled in the art should understand that the embodiments of the disclosure are not limited by the described action sequences, because certain steps may be performed in other sequences or concurrently according to the embodiments of the disclosure. Secondly, those skilled in the art should also understand that the embodiments described in the specification are all preferred embodiments, and the actions involved are not necessarily required by the embodiments of the disclosure.

The self-adaptive execution method for realizing data trustworthiness provided by the disclosure is described in detail above. Specific examples are applied to explain the principle and implementation of the disclosure herein. The above embodiments are only used to help understand the method of the disclosure and the core idea thereof. Meanwhile, for those of ordinary skills in the art, there will be changes in the specific implementation and application scope according to the idea of the disclosure. To sum up, the contents of this specification should not be construed as limiting the disclosure.

The invention claimed is:

1. A self-adaptive execution method for realizing data trustworthiness, comprising:
   starting, when a first node in a pre-built peer-to-peer (P2P) network receives a contract starting request sent by a client, a smart contract by the first node acting as a master node, and randomly selecting a plurality of slave nodes from the pre-built P2P network to enable the plurality of slave nodes to start the smart contract, wherein the smart contract is stored in a preset trusted distributed ledger;
   generating, by the master node and the plurality of slave nodes, a set of public keys and private keys after starting the smart contract, returning, by the plurality of slave nodes, the public keys in the set of public keys and private keys to the master node, and storing the private keys in the set of public keys and private keys locally;
   storing, by the master node, the public keys returned by all of the plurality of slave nodes and meta-information of the smart contract into the preset trusted distributed ledger, and returning a hash value returned by the preset trusted distributed ledger as a contract verification address to the client;
   when a second node in the pre-built P2P network receives an execution request for the smart contract sent by the client, initiating, by the second node acting as a requesting node, a call to the master node and all of the plurality of slave nodes;
   when the master node and all of the plurality of slave nodes synchronously execute the execution request for the call, keeping synchronization of contract states, synchronization of contract execution sequences, synchronization of contract input data and synchronization of contract output data with each other, and returning execution results corresponding to the execution request to the requesting node, wherein the execution results comprise signatures of the master node and the plurality of slave nodes based on the private keys of the master node and the plurality of slave nodes;
   returning, by the requesting node, the execution results to the client according to a preset result counting strategy; and
   acquiring, by the client, the public keys from the contract verification address, and verifying, by the client, the signatures in the execution results according to the public keys.

2. The self-adaptive execution method according to claim 1, wherein
   the contract starting request comprises a contract code address and an execution mode of the smart contract in the preset trusted distributed ledger, and the execution mode comprises a single-point execution mode or a multi-point execution mode;
   the self-adaptive execution method further comprises:
   when the smart contract has been developed, saving, by the client, the smart contract to the preset trusted distributed ledger, and taking the hash value returned by the preset trusted distributed ledger as the contract code address; and
   generating, by the client, the contract starting request for the contract code address, and signing the contract starting request by using the private keys of the master node and the plurality of slave nodes; and
   the step of starting, when the first node in the pre-built P2P network receives the contract starting request sent by the client, the smart contract by the first node acting as the master node, and randomly selecting the plurality of slave nodes from the pre-built P2P network to enable the plurality of slave nodes to start the smart contract, wherein the smart contract is stored in the preset trusted distributed ledger, comprises:
   starting, by the master node and the plurality of slave nodes, the smart contract according to the contract code address and according to the execution mode.

3. The self-adaptive execution method according to claim 1, wherein
   for the synchronization of the contract states, the self-adaptive execution method further comprises:
   in a process of executing the execution request, recording, by each of the master node and all of the plurality of slave nodes, an execution of the smart contract according to a predetermined contract-execution recording strategy;
   when one of the master node and all of the plurality of slave nodes fails or does not call the smart contract synchronously, determining a target node currently in a latest state among the master node and all of the plurality of slave nodes, and acquiring an execution record of the smart contract by the target node; and
   replaying the execution record of the smart contract by the target node in a third node or in a fourth node, wherein the fourth node does not synchronously call the smart contract, and the third node is randomly selected in the pre-built P2P network.

4. The self-adaptive execution method according to claim 3, wherein
   when the predetermined contract-execution recording strategy is a transaction-based contract-execution recording strategy, a transaction record file is provided in each of the master node and the plurality of slave nodes;
   in the process of executing the execution request, the step of recording, by each of the master node and all of the plurality of slave nodes, the execution of the smart contract according to the predetermined contract-execution recording strategy, comprises:

in the process of executing the execution request, determining, by each of the master node and all of the plurality of slave nodes, whether a transaction request exists; and if the transaction request exits, labeling, by each of the master node and the plurality of slave nodes, a transaction corresponding to the transaction request, and writing parameters inputted when executing the transaction and used input/output (I/O) data into the transaction record file as a first transaction record; and the step of replaying the execution record of the smart contract by the target node in the third node or in the fourth node, wherein the fourth node does not synchronously call the smart contract, and the third node is randomly selected in the pre-built P2P network, comprises:

receiving, by the third node or the fourth node, a transaction record file of the target node, and determining whether the transaction record file of the target node has a second transaction record next to the first transaction record; and if the second transaction record exists, determining, by the third node or the fourth node, whether the second transaction record is written into a local transaction record file, and executing, by the third node or the fourth node, a transaction according to the second transaction record.

5. The self-adaptive execution method according to claim 3, wherein when the predetermined contract-execution recording strategy is a heap-operation-based contract-execution recording strategy, a heap-operation record file is provided in each of the master node and the plurality of slave nodes; and in the process of executing the execution request, the step of recording, by each of the master node and all of the plurality of slave nodes, the execution of the smart contract according to the predetermined contract-execution recording strategy, comprises:

in a process of calling the smart contract, determining, by each of the master node and all of the plurality of slave nodes, whether a transaction request exists; and if no transaction request exists, deleting, by each of the master node and the plurality of slave nodes, repeatedly assigned operations in a recorded heap operation, and then writing remaining recorded heap operations into the heap-operation record file;

if the transaction request exits, executing, by each of the master node and the plurality of slave nodes, the following steps:

determining whether a first unrecorded heap operation has been generated;

if the first unrecorded heap operation has been generated, determining whether the first unrecorded heap operation is an operation on a local variable; and if the first unrecorded heap operation is not the operation on the local variable, recording the first unrecorded heap operation and continuing determining whether a second unrecorded heap operation has been generated; and the step of replaying the execution record of the smart contract by the target node in the third node or in the fourth node, wherein the fourth node does not synchronously call the smart contract, and the third node is randomly selected in the pre-built P2P network, comprises:

receiving, by the third node or the fourth node, a heap-operation record file of the target node, and determining whether the heap-operation record file of the target node has a next heap-operation record; and if the next heap-operation record exists, resolving, by the third node or the fourth node, the next heap-operation record and executing a resolution result.

6. The self-adaptive execution method according to claim 3, wherein when the predetermined contract-execution recording strategy is a heap-dump-based contract-execution recording strategy, a heap-dump record file is provided in each of the master node and the plurality of slave nodes; and in the process of executing the execution request, recording, by each of the master node and all of the plurality of slave nodes, the execution of the smart contract according to the predetermined contract-execution recording strategy, comprises:

after executing the execution request for the smart contract, acquiring, by each of the master node and all of the plurality of slave nodes, a plurality of objects in the smart contract at a current moment, and determining whether an unresolved object exists among all of the plurality of objects in the smart contract at the current moment;

if no unresolved object exists among all of the plurality of objects in the smart contract at the current moment, writing, by each of the master node and the plurality of slave nodes, all of the plurality of objects in the smart contract at the current moment into the heap-dump record file; and if the unresolved object exists among all of the plurality of objects in the smart contract at the current moment, executing, by each of the master node and the plurality of slave nodes, the following steps:

determining, by each of the master node and the plurality of slave nodes, whether an unresolved attribute exists in an object of the plurality of objects;

if the unresolved attribute exists in the object, resolving, by each of the master node and the plurality of slave nodes, the object and an attribute of the object, and after resolving the object and the attribute of the object, storing the object and the attribute of the object into a pre-created Map of each of the master node and the plurality of slave nodes; and if no unresolved attribute exists in the object, storing, by each of the master node and the plurality of slave nodes, the object into the pre-created Map.

7. The self-adaptive execution method according to claim 6, wherein the step of replaying the execution record of the smart contract by the target node in the third node or in the fourth node, wherein the fourth node does not synchronously call the smart contract, and the third node is randomly selected in the pre-built P2P network, comprises:

receiving, by the third node or the fourth node, a heap-dump record file of the target node;

resolving, by the third node or the fourth node, the heap-dump record file of the target node, and storing contents in the heap-dump record file of the target node into the pre-created Map;

determining, by the third node or the fourth node, whether an unrecovered object exits in the pre-created Map;

if the unrecovered object exists in the pre-created Map, creating, by the third node or the fourth node, the unrecovered object; and if no unrecovered object exists in the pre-created Map, determining, by the third node or the fourth node, whether an object with an unrecovered attribute exists in the pre-created Map, and, if the object with the unrecovered attribute exists in the pre-created Map, recovering the unrecovered attribute of the object with the unrecovered attribute.

8. The self-adaptive execution method according to claim 1, wherein for the synchronization of the contract execution sequences, the self-adaptive execution method further comprises:

sequencing, by the requesting node, the execution request by using a Practical *Byzantine* Fault Tolerance (PBFT) algorithm, wherein in the PBFT algorithm, the execution request goes through the following stages:

REQUEST: the client sends the execution request to the requesting node;

PRE-PREPARE: the requesting node allocates a sequence number for the execution request, and broadcasts a PRE-PREPARE request to the master node and all of the plurality of slave nodes;

PREPARE: after receiving the PRE-PREPARE request, the master node and all of the plurality of slave nodes verify a correctness of the PRE-PREPARE request, and, if the PRE-PREPARE request is verified to be correct, broadcast a PREPARE message, and record the PRE-PREPARE request and the PREPARE message to a local log;

COMMIT: if receiving more than 2f+1 valid PREPARE messages consistent with the master node and all of the plurality of slave nodes, the master node and all of the plurality of slave nodes determine that the step of sequencing the execution request is successful, execute the execution request of each of sequenced smart contracts locally in sequence, sign the execution results by the private keys of the master node and all of the plurality of slave nodes and then send the execution results to the requesting node; and REPLY: after receiving 2f+1 valid COMMIT messages consistent with the master node and all of the plurality of slave nodes, the master node and all of the plurality of slave nodes execute the execution request locally, and send a REPLY message to the client through the requesting node; the client is configured to confirm the execution results returned by the requesting node when receiving f+1 valid REPLY messages inconsistent with the master node and the plurality of slave nodes.

9. The self-adaptive execution method according to claim 1, wherein a plurality of smart contracts are provided, and for the synchronization of the contract input data and the synchronization of the contract output data, the self-adaptive execution method further comprises:

de-duplicating, by the requesting node, redundant calls in the plurality of smart contracts for the execution request, wherein an external input and an external output are generated only once.

10. The self-adaptive execution method according to claim 1, wherein the preset result counting strategy is an ALL strategy, a MOST strategy or a FIRST strategy, and the step of returning, by the requesting node, the execution results to the client according to the preset result counting strategy, comprises:

the ALL strategy: after the execution results of the master node and all of the plurality of slave nodes are all returned, the requesting node returns the execution results to the client, and attaches abbreviations of the public keys of the master node and all of the plurality of slave nodes;

the MOST strategy: after the requesting node receives the execution results of more than half of the master node and all of the plurality of slave nodes, the requesting node returns the execution results to the client, and attaches the abbreviations of the public keys of the master node and the plurality of slave nodes already returning the execution results; and the FIRST strategy: after the requesting node receives the execution results first returned by one node in the master node and all of the plurality of slave nodes, the requesting node returns the execution results to the client, and attaches the abbreviations of the public keys of the master node and the plurality of slave nodes.

\* \* \* \* \*